United States Patent
Horn et al.

(10) Patent No.: US 11,326,498 B2
(45) Date of Patent: May 10, 2022

(54) EXHAUST GAS HEAT RECOVERY SYSTEM AND EXHAUST SYSTEM

(71) Applicant: VOLKSWAGEN AKTIENGESELLSCHAFT, Wolfsburg (DE)

(72) Inventors: André Horn, Braunschweig (DE); Asmus Carstensen, Osloss (DE); Artur Semke, Wolfsburg (DE); Thomas Maischik, Sickte (DE); Thomas Schulenburg, Isenbüttel (DE)

(73) Assignee: VOLKSWAGEN AKTIENGESELLSCHAFT, Wolfsburg (DE)

(\*) Notice: Subject to any disclaimer, the term of this patent is extended or adjusted under 35 U.S.C. 154(b) by 0 days.

(21) Appl. No.: 16/899,565

(22) Filed: Jun. 11, 2020

(65) Prior Publication Data
US 2020/0392885 A1    Dec. 17, 2020

(30) Foreign Application Priority Data

Jun. 12, 2019 (DE) .................... 10 2019 115 911.3

(51) Int. Cl.
*F01N 5/02* (2006.01)
*F01K 23/06* (2006.01)
(Continued)

(52) U.S. Cl.
CPC .............. *F01N 5/02* (2013.01); *F01K 23/065* (2013.01); *F01N 3/0205* (2013.01); *F01N 3/04* (2013.01);
(Continued)

(58) Field of Classification Search
CPC . F01N 5/02; F01N 3/0205; F01N 3/04; F01N 3/2882; F01N 2230/04;
(Continued)

(56) References Cited

U.S. PATENT DOCUMENTS 5,445,027 A    8/1995 Zoerner
2005/0229595 A1    10/2005 Hoetger et al.
(Continued)

FOREIGN PATENT DOCUMENTS

DE        41 27 395 A1    2/1993
DE    10 2010 052508 A1    5/2012
(Continued)

OTHER PUBLICATIONS

Search report for German Patent Application No. 10 2019 115 911.3, dated Mar. 17, 2020.
Search report for European Patent Application No. 20179401.3, dated Nov. 9, 2020.

*Primary Examiner* — Mark A Laurenzi
*Assistant Examiner* — Mickey H France
(74) *Attorney, Agent, or Firm* — Pearl Cohen Zedek Latzer Baratz LLP

(57) ABSTRACT

An exhaust gas heat recovery system for an internal combustion engine has a pump for conveying an operating fluid, an evaporator for converting the operating fluid from the liquid state to the gaseous state, and a condenser for liquefaction of the operating fluid, and having an expansion engine through which the gaseous operating fluid can flow. A sensor is arranged on the expansion engine with which a function of the expansion engine can be monitored. An exhaust system may have such an exhaust gas heat recovery system, and a method for the diagnosis of such an exhaust heat recovery system.

9 Claims, 3 Drawing Sheets

(51) Int. Cl.
*F01N 3/02* (2006.01)
*F01N 3/04* (2006.01)
*F01N 3/28* (2006.01)
*F02G 1/047* (2006.01)
*F02G 1/055* (2006.01)
*F02G 5/02* (2006.01)

(52) U.S. Cl.
CPC ........... *F01N 3/2882* (2013.01); *F02G 1/047* (2013.01); *F02G 1/055* (2013.01); *F02G 5/02* (2013.01); *F01N 2230/04* (2013.01); *F01N 2240/02* (2013.01); *F01N 2260/024* (2013.01)

(58) Field of Classification Search
CPC ........... F01N 2240/02; F01N 2260/024; F01K 23/065; F02G 1/047; F02G 1/055; F02G 5/02; F02G 1/04; F02G 2275/10; Y02T 10/12; G01M 7/00; G01H 1/003
USPC .................................................. 60/614–620
See application file for complete search history.

(56) References Cited

U.S. PATENT DOCUMENTS

| | | | |
|---|---|---|---|
| 2010/0090795 A1* | 4/2010 | Grieb | G05B 19/404 |
| | | | 340/3.42 |
| 2013/0318967 A1 | 12/2013 | Gaertner et al. | |
| 2015/0047351 A1 | 2/2015 | Ishikawa et al. | |
| 2016/0322814 A1 | 11/2016 | Melnyk | |
| 2016/0369678 A1* | 12/2016 | Barciela | F02D 19/02 |
| 2017/0254226 A1* | 9/2017 | Heber | F01K 23/101 |
| 2019/0265204 A1* | 8/2019 | Morel | G01N 29/44 |
| 2020/0123933 A1* | 4/2020 | Bucher | F01K 23/065 |

FOREIGN PATENT DOCUMENTS

| | | |
|---|---|---|
| DE | 10 2012 204 086 A1 | 9/2013 |
| DE | 10 2012 216 537 A1 | 3/2014 |
| DE | 11 2012 004 058 T5 | 7/2014 |
| DE | 10 2015 201 203 A1 | 7/2016 |
| DE | 10 2015 016 759 A1 | 8/2016 |
| DE | 10 2016 107 458 A1 | 11/2016 |
| DE | 10 2017 200 964 A1 | 7/2018 |
| EP | 1 049 863 | 11/2000 |
| KR | 2012 0013547 A | 2/2012 |

* cited by examiner

EXHAUST GAS HEAT RECOVERY SYSTEM AND EXHAUST SYSTEM

CROSS REFERENCE TO RELATED APPLICATION

This application claims priority from German Patent Application No. 10 2019 115 911.3, filed Jun. 12, 2019, which is hereby incorporated by reference.

FIELD OF THE INVENTION

The invention relates to an exhaust gas heat recovery system for an internal combustion engine, an exhaust system having such an exhaust gas heat recovery system and a method for operating such an exhaust gas heat recovery system.

BACKGROUND OF THE INVENTION

When developing motor vehicles having an internal combustion engine, further potentials are always sought in order to minimize fuel consumption and increase efficiency. Since in conventional internal combustion engines a significant proportion of the energy is emitted into the environment via the exhaust gas, systems for exhaust gas heat recovery are known in internal combustion engines, with which the energy contained in the exhaust gas stream can be used at least in part. For this purpose, a heat exchanger is provided in the exhaust system of the internal combustion engine, via which the waste heat of the internal combustion engine is transferred to a steam circuit, the steam circuit driving a turbine, via which this energy can be used as mechanical drive power and/or electrical energy. An exhaust gas heat recovery system typically includes four main components: a pump, an evaporator, an expander, and a condenser. Cooling water for cooling the internal combustion engine generally flows through the condenser of the exhaust gas heat recovery system. The working medium of the steam circuit of the exhaust gas heat recovery system is cooled in the condenser.

From DE 41 273 95 A1, a steam turbine is known in which for the early detection and location of a change to a component of the turbine, in particular at a turbine blade, a deviation of a measured value is detected during operation of the turbine from the standard value a sound spectrum generated by the component inside the turbine is detected and compared with a reference spectrum. To increase the intensity of the signals in the sound spectrum, the components of the turbine, preferably the rotor blades, are stimulated from outside to emit sound. For the purpose of detecting and locating changes, the steam turbine comprises a probe for sound detection that can be inserted into the inside of the turbine from the outside.

From DE 10 2015 016 759 A1, a method for monitoring a device for utilizing waste heat in a motor vehicle is known, wherein, in order to determine wear or a defect in an expansion machine integrated in a working circuit of the device, it is provided that when the device is started, an electrical generator downstream of the expansion machine is operated in the normal operation of the working circuit by means of a converter as a drive unit for the expansion machine in such a way that the expansion machine is moved at a desired speed.

From DE 10 2015 201 203 A1, a method for detecting cavitation in the operation of a hydraulic machine is known, comprising at least one impeller, wherein a determined actual value is compared with a known reference value for an intact hydraulic working machine with the aid of at least one structure-borne noise sensor, and by means of the deviation it is concluded whether the hydraulic machine is worn or defective.

The invention is based on the object of detecting damage to the expansion engine in an exhaust gas recovery system of an internal combustion engine in order to rule out major damage.

SUMMARY OF THE INVENTION

According to the invention, this object is achieved by an exhaust gas heat recovery system for an internal combustion engine, having a pump for conveying an operating fluid, an evaporator for converting the operating fluid from the liquid state to the gaseous state, and a condenser for liquefaction of the operating fluid, and having an expansion engine through which the gaseous operating fluid flows.

It is provided that a sensor is arranged on the expansion engine, with which a function of the expansion engine can be monitored. Such a sensor can detect damage or increased wear and tear on the expansion engine in good time and the exhaust gas heat recovery system can be switched off before serious damage to the expansion engine or other system components of the exhaust gas heat recovery system occurs. In addition, on-board diagnostics of the exhaust gas heat recovery system can be carried out in a simple and cost-effective manner The features listed in the dependent claims allow advantageous improvements and non-trivial further developments of the exhaust gas heat recovery system listed in the independent claims.

In a preferred embodiment of the invention, it is provided that the sensor is designed as a piezoresistive motion sensor. A piezoresistive motion sensor can detect deviations in the motion of the moving components of the expansion engine. Piezoresistive motion sensors are small, compact, and light.

Alternatively, it is advantageously provided that the sensor is designed as a structure-borne noise sensor. Inadmissible wear or damage to a moving component of the expansion engine usually leads to noise, for example due to imbalance on the moving components. This noise is transmitted to the housing of the expansion engine by means of structure-borne noise. The noises can be detected and recognized simply and inexpensively by a structure-borne noise sensor, so that on-board diagnostics using a structure-borne noise sensor can also be implemented simply and inexpensively.

In a preferred embodiment of the invention, it is provided that the sensor is arranged on a housing of the expansion engine. Since the vibrations of the moving components of the expansion engine are transmitted to the housing by means of structure-borne noise and radiated by the latter, diagnosis can be carried out by a sensor on the housing. An easily accessible position can be selected. The assembly of the sensor can thus be simplified and the risk that the moving components come into contact with the wiring of the sensor and damage it can be eliminated.

According to a preferred exemplary embodiment of the invention, it is provided that the expansion engine is designed as an axial piston expander. An axial piston expander is a preferred work machine to expand the vaporous operating fluid of the exhaust gas heat recovery system and to transfer the energy to an output. This energy can then be used as mechanical energy either directly to drive the internal combustion engine or an auxiliary unit or can be converted into electrical current by means of a generator.

This current can also be used directly to drive an auxiliary unit or can be temporarily stored in a battery.

It is particularly preferred if the solder of the bearing surface of the sensor is at right angles to the direction of movement of the piston of the axial piston expander. A particularly low reference signal is required, as a result of which the measurement has a low susceptibility to interference. This enables a high-quality and easily reproducible measurement of the signal.

In a further preferred embodiment of the invention, it is provided that the expansion engine is designed as a scroll expander. A scroll expander is another simple machine with which the vaporous operating fluid of the exhaust gas heat recovery system can be expanded and the energy can be used.

It is particularly preferred if the sensor is arranged concentrically to a central axis of the scroll expander. An arrangement concentric to the central axis can essentially block out noise and vibrations, which can improve the quality of the measurement and the repeatability.

According to the invention, an exhaust system for an internal combustion engine is proposed having an exhaust gas turbocharger and at least one catalyst, and having an exhaust gas heat recovery system according to the invention. By means of an exhaust system according to the invention, at least one otherwise unused waste heat of the exhaust gas can be converted into mechanical and/or electrical energy and fed to the internal combustion engine, an auxiliary unit, the drive train of a motor vehicle, or another consumer. Damage or impermissibly high wear on the expansion engine can be recognized in good time before serious damage to the exhaust gas heat recovery system occurs. Proper operation can also be monitored as part of on-board diagnostics.

In an advantageous embodiment of the exhaust system, it is provided that the evaporator is integrated in a heat exchanger through which the exhaust gas of the internal combustion engine can flow. The operating fluid of the exhaust gas heat recovery system can be vaporized in a simple manner and without additional energy expenditure by the exhaust gas energy.

In a preferred embodiment of the exhaust system, it is provided that the exhaust system comprises a first catalyst and a second catalyst, wherein the heat exchanger is arranged downstream of the two catalysts in the flow direction of an exhaust gas stream of the internal combustion engine. As a result, the exhaust gas aftertreatment components, in particular the catalysts, can be quickly heated to their operating temperature after a cold start of the internal combustion engine in order to minimize the emissions of the internal combustion engine. Only after the exhaust system has warmed up and the waste heat losses increase, this waste heat can be used in a targeted manner by the exhaust gas heat recovery system. This is particularly the case when the internal combustion engine is operated for a longer period of time with medium to high power, for example when driving on the freeway or driving in the mountains.

According to the invention, a method for diagnosing an exhaust gas heat recovery system according to the invention is proposed, wherein the signal strength of the sensor is determined over at least one revolution of the expansion engine and compared with a maximum permissible signal strength, wherein the expansion engine is switched off or disconnected when the signal strength exceeds the maximum permissible signal strength. As a result, the function of the exhaust gas heat recovery system, in particular of the expansion engine, can be monitored in a simple manner. In addition, measures to protect the components of the exhaust gas heat recovery system can be initiated and, in particular, the expansion engine can be uncoupled or switched off if damage or impermissibly high wear is detected.

In an advantageous further development of the method, it is provided that the signal strength is averaged over at least ten revolutions, preferably by at least 25 revolutions, particularly preferably by at least 40 revolutions, and the mean value is compared with the maximum permissible signal strength. Random measurement errors can be compensated for by averaging over at least ten revolutions, so that an undesired shutdown of the exhaust gas heat recovery system is avoided when the expansion engine is intact.

Unless otherwise stated in the individual case, the various embodiments of the invention mentioned in this application can advantageously be combined with one another.

BRIEF DESCRIPTION OF THE DRAWINGS

The invention is explained below in exemplary embodiments with reference to the accompanying drawings. The same components or components having the same function are identified in the different figures with the same reference numerals. In the drawings.

DETAILED DESCRIPTION OF THE INVENTION

Figure 1:
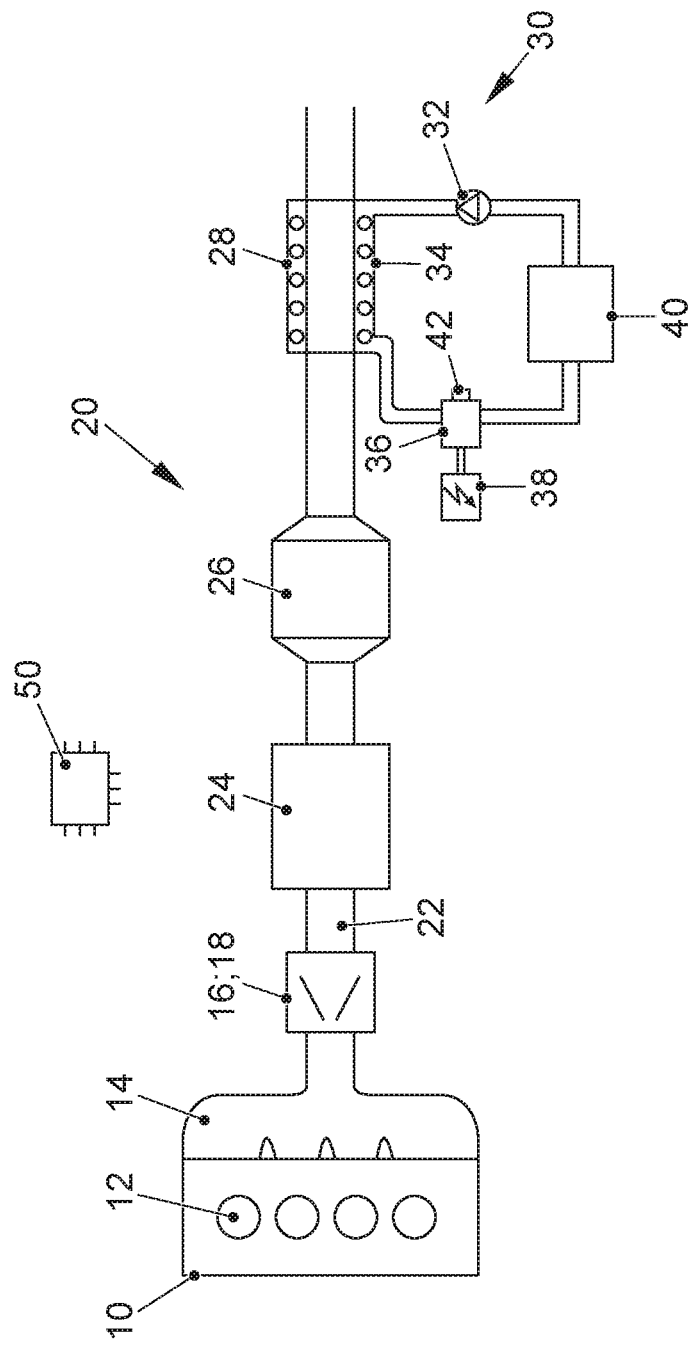
FIG. 1 is an exemplary embodiment of an internal combustion engine having an exhaust system according to the invention, which has an exhaust gas heat recovery system.

FIG. 1 shows an internal combustion engine 10 with at least one combustion chamber 12, which is provided for driving a motor vehicle. In FIG. 1, the internal combustion engine 10 is designed as a four-cylinder in-line engine. Alternatively, however, other embodiments, preferably with two to twelve cylinders, are also possible. The internal combustion engine 10 can alternatively also be designed as a V-engine or boxer engine. The internal combustion engine 10 has a coolant circuit, via which the engine block of the internal combustion engine 10 is cooled in order to dissipate the waste heat from the internal combustion engine 10. The internal combustion engine 10 is connected by its outlet 14 to an exhaust system 20. The exhaust system 20 includes an exhaust duct 22, in which a turbine 18 of an exhaust gas turbocharger 16 and downstream of the turbine 18 of the exhaust gas turbocharger 16 a plurality of exhaust gas aftertreatment components 24, 26 and a heat exchanger 28 are arranged in the flow direction of an exhaust gas of the internal combustion engine 10 through the exhaust duct 22. In a preferred embodiment, the internal combustion engine 10 is designed as a self-igniting diesel engine and the exhaust gas aftertreatment components 24, 26 comprise an oxidation catalyst, a NOx storage catalyst, a particle filter, and/or a catalyst for the selective catalytic reduction of nitrogen oxides.

Alternatively, the internal combustion engine 10 can be designed as a gasoline engine, a first catalyst 24 being arranged in the exhaust system and a second catalytic converter being arranged downstream of the first catalytic converter 24. One of the catalysts 24, 26 is preferably designed as a three-way catalyst and the other catalyst 24, 26 is designed as an additional three-way catalyst or as a four-way catalyst. The exhaust gas aftertreatment components 24, 26 and the heat exchanger 28 can also be arranged as an exhaust gas heat recovery assembly in a common housing in order to simplify the assembly of the exhaust system 20.

The exhaust gas heat recovery system 30 comprises, in addition to the heat exchanger 28, which also serves as an evaporator 34 for an operating fluid of the exhaust gas heat recovery system 30, an expansion engine 36, a condenser 40, and a pump 32 which serves to convey the operating fluid. The exhaust gas heat recovery system 30 further comprises a reservoir for the operating fluid, in particular an organic working medium, preferably alcohol or an alcohol-water mixture, particularly preferably ethanol or an ethanol-water mixture. The reservoir is connected via a power to the pump 32, in which the operating fluid is compressed. The compressed operating fluid is supplied to the evaporator 34, where it is converted into the gaseous state by the waste heat from the exhaust gas stream of the internal combustion engine 10. The gaseous operating fluid is supplied to the expansion engine 36, wherein the expansion engine draws energy from the operating fluid. The expansion engine 36 is operatively connected to a generator 38 which converts the kinetic energy of the expansion engine into electrical current. Alternatively or additionally, the expansion engine 36 can also be mechanically connected to the internal combustion engine 10 and feed the energy into the drive train. The generator 38 can be connected to an electrical system of a motor vehicle and/or temporarily store the electrical energy in a battery.

Downstream of the expansion engine 36, a condenser 40 is arranged in the exhaust gas heat recovery system 30, which has a coolant inlet and a coolant return and is connected to the cooling water circuit of the internal combustion engine 10. In the condenser 40, the operating fluid of the exhaust gas heat recovery system 30 is converted back into the liquid state before it is returned to the pump 32 via a return line.

A sensor 42 is arranged on the expansion engine 36, with which the function of the expansion engine 36 is monitored. In the context of an on-board diagnosis, minor damage can already be detected before this damage increases and the entire exhaust gas heat recovery system 30 is threatened to be damaged. Furthermore, the wear on the expansion engine 36 can be monitored.

The internal combustion engine 10 and the exhaust gas heat recovery system 30, in particular the sensor 42, are connected to a control unit 50 of the internal combustion engine 10.

Figure 2:
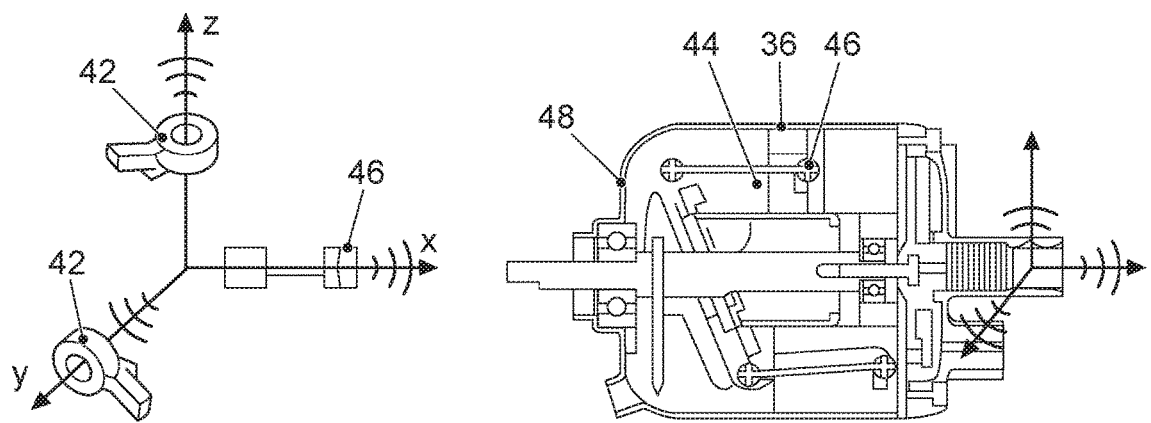
FIG. 2 is an exemplary embodiment of an expansion engine in an exhaust gas heat recovery system having a sensor for function monitoring.

FIG. 2 shows a preferred exemplary embodiment of such an expansion engine 36 having a sensor 42. The sensor 42 is preferably designed as a piezoresistive acceleration sensor or as a structure-borne noise sensor and is mounted on a housing 48 of the expansion engine 36. In FIG. 2, the expansion engine 36 is designed as an axial piston expander 44. The axial piston expander 44 has at least one piston 46, preferably a plurality of pistons 46, which are displaceably mounted in the housing 48. The sensor 42 is preferably mounted such that the solder of the bearing surface of the sensor 42 is at right angles to the direction of movement of the piston 46.

Figure 3:
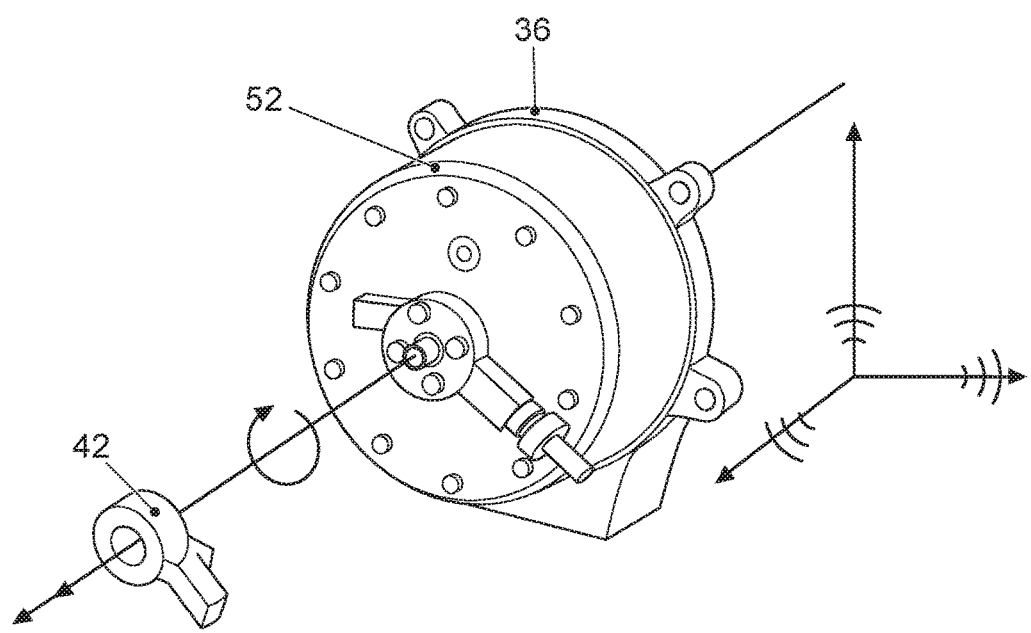
FIG. 3 is another exemplary embodiment of an expansion engine in an exhaust gas heat recovery system having a sensor for monitoring the function of the expansion engine.

FIG. 3 shows an alternative exemplary embodiment of an expansion engine 36 according to the invention. The expansion engine 36 is designed as a scroll expander 52. In this exemplary embodiment, the sensor 42 is arranged concentrically to the axis of rotation of the scroll expander 52.

An advantage of the assembly positions described is that a relatively low reference signal compared to the assembly position in the direction of movement of the piston 46 is necessary for the non-conspicuous component state of the expansion engine 36.

A possible diagnostic variable is the signal strength of the piezoresistive acceleration sensor 42 used. To determine this variable, the averaged signal strength is recorded, for example, under stationary boundary conditions over a certain number of revolutions, preferably over at least ten revolutions, preferably over at least 25 revolutions, particularly preferably over at least 40 revolutions. The signal strength determined in this way is then compared with a maximum permissible signal strength. If this maximum permissible signal strength is exceeded, the operation of the exhaust gas heat recovery system 30 is stopped. Excessive wear of the expansion engine 36 and the impairment of the functionality of other system components of the exhaust gas heat recovery system 30 can thereby be avoided.

Another possible diagnostic variable for damage or wear prediction is the evaluation of the variance of the signal strength under stationary boundary conditions. The current variance determined in this way is also compared with a reference value. This comparison can also be used as a switch-off criterion for the exhaust gas heat recovery system 30.

An alternative measurement setup consists of two motion sensors or structure-borne noise sensors having mounting surfaces offset by 90° to one another. In the case of an axial piston expander 44, the solder can run parallel to the direction of movement of the piston 46 on a mounting surface.

Figure 4:
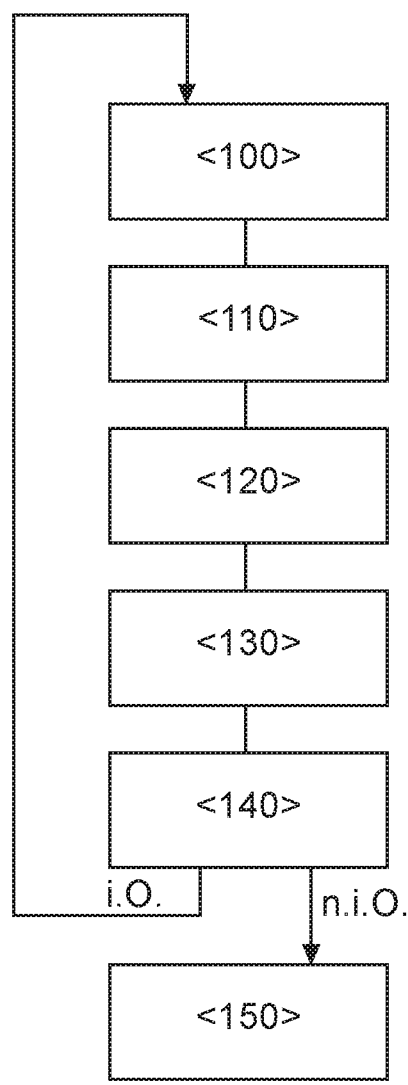
FIG. 4 is a flowchart for carrying out a method according to the invention for diagnosing an exhaust gas heat recovery system.

FIG. 4 shows a method according to the invention for diagnosing an exhaust gas heat recovery system 30, in particular an expansion engine 36 of such an exhaust gas heat recovery system 30. In a first method step <100>, the operating fluid of the exhaust gas heat recovery system 30 is compressed by the pump 32. In a method step <110>, the compressed operating fluid is fed to the evaporator 34 and converted into the gaseous state. In a method step <120>, the gaseous operating fluid is supplied to the expansion engine 36 and expanded in the latter. In one method step, the expansion engine 36 transmits power to a generator 38, where this power can be converted into electrical current and/or can be temporarily stored in a battery. In a method step <130>, the operating fluid is condensed and returned to the pump 32. In a method step <140>, the signal from sensor 42 is evaluated and compared with a maximum permissible signal. If the signal is smaller, the method is continued with step <100>. If the signal is inadmissibly large, it is concluded that the expansion engine 36 is damaged or inadmissibly high and the method is ended in a method step <150>.

LIST OF REFERENCE NUMERALS 10 internal combustion engine
12 combustion chamber
14 outlet
16 turbocharger 18 turbine
20 exhaust system
22 exhaust duct
24 first catalyst
26 second catalyst
28 heat exchanger
30 exhaust gas heat recovery system
32 pump
34 evaporator
36 expansion engine
38 generator
40 condenser
42 sensor
44 axial piston expander
46 pistons
48 housing
50 control unit
52 scroll expander

The invention claimed is:

1. An exhaust gas heat recovery system for an internal combustion engine, comprising:
    a pump for conveying an operating fluid,
    an evaporator for converting the operating fluid from the liquid state to the gaseous state,
    a condenser for liquefaction of the operating fluid,
    an expansion engine through which the gaseous operating fluid flows, and
    a sensor arranged on the expansion engine with which a function of the expansion engine can be monitored,
    wherein the expansion engine is designed as an axial piston expander, and
    wherein a solder of the bearing surface of the sensor is at right angles to the direction of movement of the piston of the axial piston expander.

2. The exhaust gas heat recovery system according to claim 1, wherein the sensor is designed as a piezoresistive motion sensor.

3. The exhaust gas heat recovery system according to claim 1, wherein the sensor (42) is designed as a structure-borne noise sensor.

4. The exhaust gas heat recovery system according to claim 1, wherein the sensor is arranged on a housing of the expansion engine.

5. An exhaust system for an internal combustion engine comprising:
    an exhaust gas turbocharger,
    at least one catalyst, and
    an exhaust gas heat recovery system according to claim 1.

6. The exhaust system for an internal combustion engine according to claim 5, wherein the evaporator is integrated in a heat exchanger through which the exhaust gas of the internal combustion engine can flow.

7. The exhaust system for an internal combustion engine according to claim 6, further comprising a first catalyst and a second catalyst, wherein the heat exchanger is arranged downstream of the first and second catalysts in the flow direction of an exhaust gas stream of the internal combustion engine.

8. A method for diagnosing an exhaust gas heat recovery system according to claim 1, comprising:
    determining the signal strength of the sensor over at least one revolution of the expansion engine,
    compared the signal strength of the sensor with a maximum permissible signal strength,
    switching off or disconnecting the expansion engine when the signal strength exceeds the maximum permissible signal strength.

9. The method for diagnosing an exhaust gas heat recovery system according to claim 8, further comprising averaging the signal strength over at least 10 revolutions and comparing the mean value with the maximum permissible signal strength.

* * * * *